United States Patent [19]
Udd et al.

[11] Patent Number: 5,118,931
[45] Date of Patent: Jun. 2, 1992

[54] FIBER OPTIC MICROBENDING SENSOR ARRAYS INCLUDING MICROBEND SENSORS SENSITIVE OVER DIFFERENT BANDS OF WAVELENGTHS OF LIGHT

[75] Inventors: Eric Udd, Huntington Beach; John P. Theriault, Fountain Valley, both of Calif.

[73] Assignee: McDonnell Douglas Corporation, Long Beach, Calif.

[21] Appl. No.: 578,381

[22] Filed: Sep. 7, 1990

[51] Int. Cl.⁵ ............................................. H01J 5/16
[52] U.S. Cl. ........................... 250/227.16; 250/227.23
[58] Field of Search .................... 250/227.14, 227.15, 250/227.16, 227.18, 227.23, 227.24, 227.28, 226

[56] References Cited

U.S. PATENT DOCUMENTS

| | | |
|---|---|---|
| 4,421,979 | 12/1983 | Asawa et al. ............ 250/227.16 |
| 4,459,477 | 7/1984 | Asawa et al. ............ 250/227.16 |
| 4,463,254 | 7/1984 | Asawa et al. ............ 250/227.16 |
| 4,477,725 | 10/1984 | Asawa et al. ............ 250/227.16 |
| 4,727,254 | 2/1988 | Wlodarczyk ............ 250/227.18 |
| 4,743,113 | 5/1988 | Jubinski ..................... 356/345 |
| 4,798,951 | 1/1989 | Walker ..................... 250/227.23 |
| 4,891,511 | 1/1990 | Reed ........................ 250/227.16 |
| 5,013,908 | 5/1991 | Chang ...................... 250/227.15 |

Primary Examiner—David C. Nelms
Assistant Examiner—John R. Lee
Attorney, Agent, or Firm—Gregory A. Cone; John P. Scholl

[57] ABSTRACT

A fiber optic sensing system detects changes in a material based upon physical deformation of a fiber bonded to the structure in which stress, strain or failure is to be detected. Deformation of the fiber affects propagation of light therethrough, permitting detection based upon detected changes in light throughput.

6 Claims, 1 Drawing Sheet

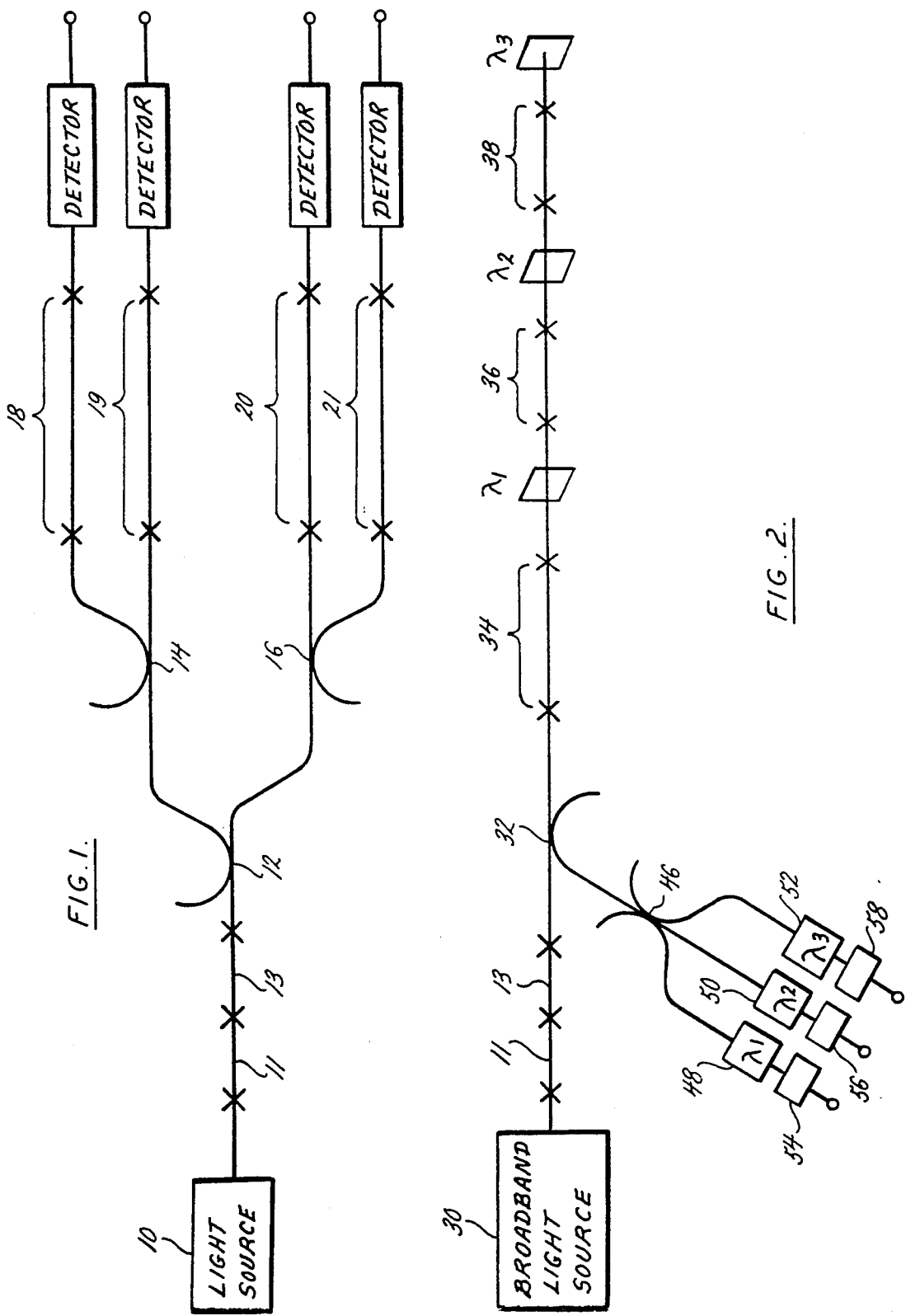

FIBER OPTIC MICROBENDING SENSOR ARRAYS INCLUDING MICROBEND SENSORS SENSITIVE OVER DIFFERENT BANDS OF WAVELENGTHS OF LIGHT

BACKGROUND OF THE INVENTION

Failure modes in physical structures occur in several different ways, but generally always begin in a small fashion and increase with time. Detection of failure early can prevent costly damage due to a completed failure. However, the cost of inspection, including labor and downtime often mitigates in favor of allowing total breakdown rather than the desired preventative maintenance.

Any system which could detect the onset of failure would be of great benefit in preventing the cost associated with total failure to the point of destruction. Further, a system of sufficient resolution could monitor smaller failures and permit replacement of the part at a point just before the failures become large enough to warrant a danger of destructive failure.

Any such monitoring system, to be worth its employment, would have to be low cost, require as little inspection time as possible, and have a high resolution. Ideally such a system would be selectably operable as a passive or active sensor. Fiber optic systems generally have appeared in the literature and have been used in a variety of ways.

For example, U.S. Pat. No. 4,743,116 to Udd et al., and assigned to the same assignee of the instant application, entitled "Microbending Optical Fiber Accelerometer and Gyroscope" discloses a fiber optic transducer for accelerometers and gyroscopes that utilize microbending of an optical fiber between two suspended points by vibrating the optical fiber with electro-static deflection to induce modulation of a light signal to sense acceleration, tension, etc.

U.S. Pat. No. 4,295,738 to Meltz et al., entitled "Fiber Optic Strain Sensor" discloses an optical fiber having at least two cores positioned in a common cladding that can be fabricated to be responsive to strain or hydrostatic pressure but not to temperature through the selection of materials, spacing and shape of the cores and cladding in the fiber.

U.S. Pat. No. 4,301,543 to Palmer, entitled "Fiber Optic Transceiver and Full Duplex Point-To-Point Data Link" discloses a full duplex data link for use between two transceiver terminals utilizing a single optical fiber for data transmission.

U.S. Pat. No. 4,408,495 to Couch et al., entitled "Fiber Optic System For Measuring Mechanical Motion Or Vibration Of A Body" discloses a system for monitoring vibration or mechanical motion of equipment utilizing an optical waveguide sensor coupled to the equipment.

U.S. Pat No. 4,421,979, U.S. Pat. No. 4,459,477, U.S. Pat. No. 4,463,254, and U.S. Pat. No. 4,477,725 to Asawa et al., entitled "Microbending Of Optical Fibers For Remote Force Measurement" discloses a system for remote measurement of structural forces including a plurality of microbend transducers mounted along the length of the structure for microbending an optical fiber in response to structural forces.

U.S. Pat. No. 4,530,078 to Lagakos et al., entitled "Microbending Fiber Optic Acoustic Sensor" discloses a microbending fiber optic acoustic sensor. A point hydrophone according to a first preferred embodiment of the present invention includes two opposed pistons which are subjected to an acoustic pressure wave.

U.S. Pat. No. 4,632,513 to Stowe et al., entitled "Method of Making A Polarization-Insensitive, Evanescent-Wave, Fused Coupler With Minimal Environmental Sensitivity" discloses an optical coupler and method of making same. The coupling ratio of the coupler is polarization-insensitive. The optical coupler described is made from single-mode optical fibers. Each optical fiber has a length of nearly exposed core which is fused to the exposed core of the other optical fiber while the fibers are maintained in parallel juxtaposition with one another without twisting.

U.S. Pat. No. 4,657,659 to Rempt et al., entitled "Fiber Optic Displacement Sensor" discloses an optical displacement sensor that serves to sense variations in the displacement of a test article.

U.S. Pat. No. 4,678,903 to Wlodarczyk et al., entitled "Self Aligning Fiber Optic Microbend Sensor" discloses a self aligning microbend sensor comprising a tubular housing having internal threads, an expandable insert with external threads loosely threaded into the housing with sufficient tolerance to allow expansion of the inert in response to a parameter being measured while maintaining registration of the threads, and a fiber optic element between the housing and the insert and extending transverse to the threads, such that upon expansion of the insert the fiber optic element experiences microbending due to deformation by the threads.

U.S. Pat. No. 4,734,577 to Szuchy, entitled "Continuous Strain Measurement Along A Span" discloses a fiber optic load measuring system, and method of constructing the same which comprises a light source, a fiber optic attenuator, a photodetector, and a signal processor.

U.S. Pat. No. 4,738,511 to Fling, entitled "Molecular Bonded Fiber Optic Couplers and Method of Fabrication" discloses a fiber optic coupler which is formed by heating juxtaposed optically flat surfaces formed on two length of optical fiber to the glass transition temperature.

U.S. Pat. No. 4,749,248 to Aberson, Jr. et al., entitled "Device For Tapping Radiation From Or Injecting Radiation Into, Single Made Optical Fiber, And Communication System Comprising Same" discloses optical radiation efficiently removed from, or injected into, single mode optical fiber at an intermediate point along the fiber.

U.S. Pat. No. 4,770,492 to Levin et al., entitled "Pressure Or Strain Sensitive Optical Fiber" discloses pressure or strain sensitive optical fiber having a core, at least a portion of which has a predetermined refractive index for transmitting light therethrough, a cladding adjacent the core having a refractive index which is less than that of the core and a concentric light transmission layer adjacent the cladding having a refractive index which is greater than that of the cladding.

U.S. Pat. No. 4,781,424 to Kawachi et al., entitled "Single Mode Channel Optical Waveguide With A Stress-Induced Birefringence Control Region" discloses a single mode optical waveguide having a substrate, a cladding layer formed on the substrate, a core portion embedded in the cladding layer, and an elongated member for applying a stress to the core portion or a stress relief groove for relieving a stress from the core portion in the cladding layer along the core portion.

U.S. Pat. No. 4,788,868 to Wilk, entitled "Strain Measurement Apparatus And Method" discloses a method and apparatus for measuring the relative movement of one end of a cylindrical member relative to the other end employs first and second strain-sensitive, parametric elements, such as optical fibers.

U.S. Pat. No. 4,792,689 to Peterson, entitled "Method For Obtaining A Ratio Measurement For Correcting Common Path Variations In Intensity In Fiber Optic Sensors" discloses a method for correcting common path variations in intensity in fiber optic chemical sensing devices using a device for spatially separating light of different wavelength regions and a dye system selected so that light passing back to a measuring system along the fiber optic sensor consists of two wavelength regions.

U.S. Pat. No. 4,795,232 to Persson, entitled "Fibre-Optic Cable Responsive To Microbending Forces" discloses a fibre-optic responsive to microbending and forming part of a device for measuring pressure in accordance with the principle of creating a periodic mechanical disturbance in the fiber.

U.S. Pat. No. 4,799,787 to Mason, entitled "Optical Fibre Radiation Pyrometer" discloses an optical pyrometer for a gas-turbine engine having a radiation receiving head located to view the blades of the engine and supply radiation from the blades to one end of a fibre-optic cable.

U.S. Pat. No. 4,800,267 to Freal et al., entitled "Optical Fiber Microbend Horizontal Accelerometer" discloses a highly sensitive microbend horizontal fibre-optic accelerometer having been conceived, particularly useful in seismological research where minute accelerations must be detected.

U.S. Statutory Invention Registration No. H550 to Hester et al., entitled "Apparatus For Sensing Axial and Tangential Forces Exerted On A Spool Of Datalink Filament" discloses an apparatus for sensing and measuring axial force and torsional force exerted on a spool of fiber optic datalink filament as the filament is drawn off the spool at rates of speeds comparable to that experienced in the flight of a missile.

However, useful the above fiber optic devices and methods may be, there is still a need for an inexpensive system, integral with the structure being monitored.

SUMMARY OF THE INVENTION

The devices described by this disclosure are intended to disclose, among others, fiber optic sensors that may be used to support fiber optic smart structures.

The applications to which fiber optic smart structure technology may be applied are numerous. In the aerospace field these include sensors for engine surfaces to be incorporated into the engine controls, shock position detection in the engine inlets, and structural and skin integrity especially in conjunction with composite structures and titanium metal structures.

Fibers selected for microbend sensing must possess the appropriate optical properties in response to bending and appropriate size consistent with the structures into which they will be embedded. The bond achievable between the fiber and the material whose performance is to be measured is important. The more secure the bond, the greater the probability that an effect within the material will be sensed by the optical fiber.

Described here is an extremely simple approach that has produced good results. A four sensor microbend sensor was designed and used to support non-destructive testing of composites and to perform strain sensing. Additional tests were performed to determine microbend sensitivity of fibers which involved monitoring environmental parameters during the manufacture of a composite part.

BRIEF DESCRIPTION OF THE DRAWINGS

The above-mentioned and other features and objects of this invention will become more apparent by reference to the following description taken in conjunction with the accompanying drawings, in which:

FIG. 1 is a simplified schematic of the basic microbending fiber optic sensor system of the present invention; and FIG. 2 is a simplified schematic of the wavelength division multiplexed fiber optic microbending sensor system of the present invention.

DESCRIPTION OF THE PREFERRED EMBODIMENTS

The device and method of the present invention can be incorporated into the skin of a support member and indicate defects upon inspection, or in real time as they occur. Although the principles associated with microbend fibers apply to any type of material, composites demonstrate the most ideal behavior due to its ability to withstand high temperatures and the property of forming concentrated local stress. Composite material fails through cracking, fiber matrix debonding, and an interaction of these two mechanisms. Composite materials were used to verify the fiber optic indicia of defect formation.

The Optical Time Domain Reflectometer is a device which can be used to directly measure the optical pathlength of a light beam propagating in optical fiber. The technique for doing this is to measure the length of the time, also known as the time of flight, for a pulse of light to travel in the length of the fiber and be reflected back to a detector. Any discontinuity of the index of refraction along the length of the fiber will cause the time of flight to differ.

A typical reflectometer may entail the inputting of light into one leg of a four port coupler. On the output side of the coupler, one port is connected to the fiber of interest while the other goes to a detector which records the input pulse of light. The second input port of the coupler is connected to a detector which records the arrival of the back reflected pulse of light. The time lapse between the emission of the input pulse and the time of arrival of the back-reflected pulse coupled with the knowledge of the speed of light in the fiber, which is a function of the effective index at refraction, will provide a measurement of the optical pathlength of the fiber. The optical pathlength will increase for bends in and strain within the fiber.

The resolution of the optical time domain reflectometer is a function of the accuracy of the electronics used to measure the elapsed time. Other aspects of accuracy include the ability to measure the time between pulses, the pulse width of the light beam, and the speed of the electronics and detectors used in the system.

As the fiber changes its optical length due to bends and strains in the fiber, the elapsed time between pulses will change thus giving a measure of elongation or contraction. A fiber embedded in a composite will vary its length as a function of induced strain in the composite. Using this technique, is is therefore possible to monitor strain with an optical time domain reflectometer.

The optical time domain reflectometer is also used to measure excess loss within a fiber. As excess loss increases, the amount of back-reflected light increases. It is therefore possible to measure mechanisms which can cause the excess loss to vary. Furthermore it is possible to identify where on the fiber the disturbance is occurring by measuring the elapsed time between the arrival of alight pulse due to normal Fresnel back-reflection and the light pulse due to disturbance on the fiber which causes changes in the excess loss. This ability to identify the location of the disturbance along the fiber lends itself to the creation of a microbend position sensor.

One way to utilize these features for measuring strain in a composite is to embed microbend sensors in the composite. One type of microbend sensor may be formed by melting the optical fiber and pulling simultaneously to give the fiber a smaller diameter. When this is done, that portion of the fiber becomes extremely sensitive to microbends. The microbends cause the fiber to be extremely lossy over the portion with the reduced diameter. The optical time domain reflectometer can then monitor the degree of induced strain by measuring the induced microbend loss. By monitoring the time of arrivals of the back-reflected pulses of light, it is possible to differentiate among multiple point sensors within the same composite section. With the optical time domain reflectometer, only a single end of the fiber needs to be available for performing the measurement.

The excess loss due to microbending of a fiber with a reduced diameter is strain sensitive. Another low cost technique for monitoring changes in the excess loss with an optical time domain reflectometer uses both ends of the fiber. A light source is attached to one end and a detector is attached to the other. As the composite is strained, the intensity of the output will vary. By having several tape elements with a multiple detector arrangement, it would be possible to multiplex several point sensors.

Reinforcing fibers and filament materials may include carbon, graphite, Kevlar E and S-Glass (both are trademarked materials commercially available), silica, saphire, silicon carbide, steel, and tungsten. Composite matrices include aluminum, titanium, graphite aluminum super alloys and tungsten. Carbon composite matrices include carbon vapor deposited composite, resin based composite and pitch based composite. Ceramic composite matrices include chemically bonded matrices, hot pressed oxides, borides, carbides and nitrides.

The layout of the four sensor unit is shown in FIG. 1. A light source 10 which in the case of the actual hardware was an Oki edge emitting diode operating at a wavelength of 1.3 microns is coupled into an optical fiber and depolarized by an element consisting of two lengths 11 and 13 of highly birefringent polarization preserving fiber spliced at 45 degrees to each other. The lengths of the fiber are approximately 1.5 and 3 meters. The resultant element acts as a Lyot depolarizer and converts each input wavelength to a difference output polarization state.

The depolarized light beam is then split by a series of three beamsplitters 12, 14, and 16 into four fiber sensing elements. The sensing elements consists of lengths of microbend sensitive fiber 18, 19, 20 and 21 that are spliced into the system in the locations desired. The amplitude modulated light signal falls onto a detector and generates the electrical output for each of the sensors.

Experimentally it was found that the standard optical fiber varies by orders of magnitudes in microbend sensitivity. Thus, very low cost sensors can be made by splicing together lengths of microbend sensitive and microbend insensitive fiber.

It is possible to use wavelength division multiplexing techniques to augment the performance of this system as is illustrated by FIG. 2. In this case a broadband light source 30 such as a light emitting diode or a super radiant diode is depolarized in a manner similar to that described in association with FIG. 1. The light beam passes through an input/output coupler 32 and into a series of microbend sensors 34, 36, and 38 that are optimized to be microbend sensitive over different wavelength regions 1, 2 and 3. Mirrors 40, 42, and 44 are formed on the fiber itself to reflect at the three different wavelengths so that the signature of each microbend sensor is color coded and independent of the others. The reflected signals are directed by the input/output fiber coupler through a wavelength division demultiplexing element comprising a fiber optic splice 46 and narrow band pass optical filters 48, 50, and 52 corresponding to the wave lengths of the filters 40, 42, and 44 and onto detectors corresponding to each color and to each sensor.

These devices can be used for a wide variety of fiber optic smart structure applications including measurement of strain on aircraft and spacecraft, nondestructive evaluation of parts, monitoring the manufacturing process and sensors for damage and flight control. These are simple sensors that could be very low cost and find widespread application on aircraft and spacecraft.

What is claimed is:

1. A fiber optic strain sensor, comprising:
   a broadband light source producing a beam of light;
   a fiber optic beamsplitter having a first port connected to the light source, a second port connected to a wavelength division demultiplexer, and a third port;
   a plurality of microbend sensors and associated downstream mirror means each preferentially reflective to a different narrow bandwidth of wavelengths of light in optical communication with said third port of said beamsplitter, each of said microbend sensors and their associated mirror means having an optical sensitivity to strain over one of the different bandwidths;
   said wavelength division demultiplexer having its input connected to the second port of the beamsplitter, comprising a plurality of narrow band pass optical filters connected to said input and each of whose outputs will contain one of the different bandwidths from the plurality of mirror means; and
   a plurality of optical detectors, each in optical communication with the output of one of the optical filters.

2. The fiber optic strain sensor of claim 1 wherein said light source comprises a superradiant diode.

3. The fiber optic strain sensor of claim 1 wherein said light source comprises a light emitting diode.

4. The optic strain sensor of claim 1 further comprising a depolarizing element, in optical connection between said broadband light source and said first port of said wavelength division demultiplexer.

5. The strain sensor of claim 1 wherein the plurality of microbend sensors and associated downstream mirror means are connected in series to one another.

6. The strain sensor of claim 1 wherein each or the mirror means comprises a series of linear grooves formed in the perimeter of the fiber so as to form a grating selectively reflective to one of the different narrow bandwidths of light.

* * * * *